US006943873B2

(12) United States Patent
Sallee (10) Patent No.: US 6,943,873 B2
(45) Date of Patent: Sep. 13, 2005

(54) FIBER OPTICAL LASER DETECTION AND RANGING SYSTEM

(75) Inventor: Bradley Sallee, Austin, TX (US)

(73) Assignee: BAE Systems Integrated Defense Solutions Inc., Austin, TX (US)

( * ) Notice: Subject to any disclaimer, the term of this patent is extended or adjusted under 35 U.S.C. 154(b) by 0 days.

(21) Appl. No.: 09/907,148

(22) Filed: Jul. 17, 2001

(65) Prior Publication Data

US 2003/0016348 A1 Jan. 23, 2003

(51) Int. Cl.$^7$ ............................. G01B 11/26; G01C 1/00
(52) U.S. Cl. ................................ 356/141.1; 356/141.2; 356/141.4
(58) Field of Search .............................. 244/3.13, 3.16; 356/141.1–141.5; 250/206.2, 203.1, 203.2, 203.6, 208.2

(56) References Cited

U.S. PATENT DOCUMENTS

| | | | |
|---|---|---|---|
| 4,106,726 A | 8/1978 | Emmons et al. ............ 244/3.17 |
| 4,131,248 A | 12/1978 | Berglund ................... 244/3.16 |
| 4,395,121 A | 7/1983 | Nory et al. ................. 356/152 |
| 4,598,884 A | 7/1986 | Speer ........................ 244/3.16 |
| 4,634,230 A | 1/1987 | Spezio ....................... 350/358 |
| 4,675,532 A | 6/1987 | Carson ....................... 250/578 |
| 4,696,441 A | 9/1987 | Jones et al. ................ 244/3.13 |
| 4,792,675 A | 12/1988 | Laughlin .................... 250/277 |
| 4,825,063 A | 4/1989 | Halldorsson et al. ... 250/203 R |
| 4,835,381 A | 5/1989 | Sorensen, III ............. 250/277 |
| 4,923,276 A | 5/1990 | Wells ........................ 250/206.2 |
| 4,952,042 A | 8/1990 | Pinson ....................... 350/567 |
| 4,965,453 A | 10/1990 | Hoschette et al. ......... 250/349 |
| 5,014,621 A | 5/1991 | Fox et al. .................. 102/213 |
| 5,047,776 A | 9/1991 | Baller ......................... 342/52 |
| 5,052,635 A | 10/1991 | Paulet et al. .............. 244/3.11 |
| 5,056,914 A | 10/1991 | Kollodge .................... 356/5 |
| 5,082,201 A | 1/1992 | Le Bars et al. ............ 244/3.16 |
| 5,114,227 A | 5/1992 | Cleveland, Jr. ............. 356/152 |
| 5,129,595 A | 7/1992 | Thiede et al. ............. 244/3.16 |
| 5,181,263 A | 1/1993 | Derfiny ...................... 385/24 |
| 5,202,742 A | 4/1993 | Frank et al. ................ 356/5 |
| 5,275,354 A | 1/1994 | Minor et al. .............. 244/3.17 |
| 5,311,611 A | 5/1994 | Migliaccio .................. 385/120 |
| 5,319,968 A | 6/1994 | Billing-Ross et al. ..... 73/178 R |
| 5,319,969 A | 6/1994 | Billing-Ross et al. ..... 73/178 R |
| 5,323,987 A | 6/1994 | Pinson ....................... 244/3.16 |
| 5,345,304 A | 9/1994 | Allen ........................... 356/5 |
| 5,357,331 A | 10/1994 | Flockencier ................. 356/5 |
| 5,477,383 A | 12/1995 | Jain ........................... 359/565 |
| 5,500,520 A | 3/1996 | Komine ..................... 250/203.1 |
| 5,528,358 A | 6/1996 | Bjorkman et al. ........ 356/141.1 |
| 5,682,225 A | 10/1997 | DuBois et al. .............. 356/73 |
| 5,771,092 A | 6/1998 | Dubois et al. ............. 356/147 |
| 5,784,156 A | 7/1998 | Nicholson ................ 356/141.5 |
| 5,788,180 A | 8/1998 | Sallee et al. ............... 244/3.21 |
| 6,014,270 A | 1/2000 | Bergmann et al. .......... 359/710 |
| 6,163,372 A | 12/2000 | Sallee et al. ................ 356/5.1 |

Primary Examiner—Thomas H. Tarcza
Assistant Examiner—Isam Alsomiri
(74) Attorney, Agent, or Firm—Locke Liddell & Sapp LLP (57) ABSTRACT

One aspect of the invention relates to a laser ranging system. In this version of the invention, a guided missile is provided with laser that directs laser radiation in the general direction of a target that is subsequently reflected from the target back to the missile. A receiving lens is mounted on the missile that receives the reflected laser radiation. A ferrule containing optical fibers divided into a plurality of pixels that receive the reflected laser radiation from the receiving lens, wherein each pixel in the plurality of pixels is provided a different pointing angle by arranging the fibers within the pixel such that the centroid of the field of view of the fibers is different from the centroids of the field of views of the other fibers in the other pixels. A plurality of optical sensors coupled to the optical fibers, each optical sensor being dedicated to a separate pointing angle and adapted to generate an electrical signal whose amplitude is responsive to the amplitude of the reflected radiation for the pointing angle that the optical sensor is dedicated to.

11 Claims, 4 Drawing Sheets

FIG. 1

FOV

SINGLE FIBER

FIBER OPTICAL LASER DETECTION AND RANGING SYSTEM

CROSS REFERENCE TO RELATED APPLICATIONS

Not Applicable

STATEMENT ON FEDERALLY SPONSORED RESEARCH OR DEVELOPMENT

Not Applicable

BACKGROUND OF THE INVENTION

Field of the Invention

The field of the invention relates to a new and improved fiber optic LADAR (LASER detection and ranging) system. In one embodiment, it can be used to provide information to guidance systems for vehicles such as guided missiles.

The use of optical fibers for transmitting tracking information is known, but often has been applied to transmission of such information rather than collection thereof. For example, U.S. Pat. No. 4,952,042, issued Aug. 28, 1990 to Pinson and assigned to The Boeing Company, discloses the use of optical fibers for transmitting information obtained by a telescope mounted on a gimbal in the forward end of a missile to a camera mounted further back in the missile. Similarly, U.S. Pat. No. 5,052,635, issued Oct. 1, 1991, to Paulet and assigned to Thomson-CSF, discloses the use of optical fibers for transmitting remotely transmitted missile guidance information from a sensor on an unpropelled aerodynamic carrier connected to the body of the missile by a flexible link.

U.S. Pat. No. 4,923,276, issued May 8, 1990, to Wells and assigned to Teledyne Industries, Inc., discloses a fiber optic telescope including an optical train having a plurality of tapered optical fibers arranged in a plurality of cascading stages. Wells' optical fibers concentrate and magnify the incoming light waves by both their tapered form and the cascading stages. Wells requires a large number of tapered optical fibers to be combined in a concentrating relationship to amplify the signal received for use in obtaining information on location of the source of light upon which it is trained.

The use of optical target detectors utilizing laser light is disclosed in U.S. Pat. No. 5,014,621, issued May 14, 1991 to Fox, et al. and assigned to Motorola, Inc. This patent utilizes a star coupler to automatically align pencil laser beams upon a target, and to track the target based on reflections of the laser light.

The use of missile referenced beamrider guidance links is disclosed in U.S. Pat. No. 4,696,441, issued Sep. 29, 1987 to Jones, et al. and assigned to the United States of America. Jones et al. discloses a laser beam in which the strength of the beam is formed into a gaussian cross section, the beam is directed upon a target at short range, detectors on an in-flight missile detect and measure the strength of the laser beam, and a guidance system guides the missile along the beam by adjusting the guidance controls to maximize the detected strength of the beam. The Jones et al. missile includes at least one laser detector mounted outside the central longitudinal axis of the missile and requires a reference beam.

A detector device for detecting the presence and originating direction of laser radiation is disclosed in U.S. Pat. No. 4,825,063, issued Apr. 25, 1989 to Halldorsson et al. and assigned to Messerschmitt-Bölkow-Blohm GmbH. The Halldorsson device includes a plurality of discrete light collection optics, each discrete optic being capable of gathering laser radiation over a certain solid angle, which overlaps the solid angle of its neighbors. The discrete optics are mounted together in a head, regularly arranged in azimuth aligned planes and elevation aligned planes. In Halldorsson's device, first, second and third wave guides are coupled to each discrete optic, with all first wave guides having identical lengths, shorter than the second and third wave guides. The lengths of the second and third wave guides are of increasing length in the direction of increasing azimuth and elevation angle, respectively, in order to form different transit times. In Halldorsson's device, first, second and third detector stages have opto-electrical transducers and are coupled respectively to the first, second and third wave guides. Transit time measuring circuits are coupled to the first, second and third detector stages which determine, respectively, the total time between detection by the first detector stage and the second and third detector stages. Based upon the times of arrival, the azimuth angle and the elevation angle of the incident laser radiation is determined. Halldorsson's system is limited by its use of discrete optics, a high speed counter for measuring time, and its use of a head for mounting its plurality of neatly aligned azimuth and elevation planes of identical discrete optics. Halldorsson's degree of accuracy is limited by the measurement only of transit time differences.

U. S. Pat. No. 5,784,156 issued Jul. 21, 1998 to Nicholson, describes a fiber optic system for laser guided missiles which uses an array of apertures disposed along the vehicle in non-uniform locations. Each aperture is provided with a set of fibers including start and stop fibers. The fibers receive incoming radiation, transmit the radiation as optical signals to start and stop detectors. The detectors measure a signal strength and time delay related to the length of the start and stop fibers through which the optical signals have been transmitted. This information is later used by a microprocessor to calculate the direction to the radiation source relative to the vehicle. The above mentioned patents are incorporated by reference as though set forth in full.

None of the systems disclosed in these prior art patents provide the features disclosed in the following specification.

BRIEF SUMMARY OF THE INVENTION

One aspect of the invention relates to a laser guidance system. In one embodiment, the system includes a laser that transmits a beam of laser radiation to a target area, a collecting lens for receiving reflected laser radiation from the target area and directing the received laser radiation onto an image plane at least two optical fibers having different pointing angles, arranged to pass the received radiation from the image plane to at least two optical detectors that convert laser radiation into electrical signals whose amplitude is proportional to the amplitude of the laser radiation, the detectors being associated with different pointing angles, and a computer that uses the electrical signals from the optical detectors to determine the direction of the received laser radiation.

Another aspect of the invention relates to laser guided missiles. In this version of the invention, a guided missile is provided with laser that directs laser radiation in the general direction of a target that is subsequently reflected from the target back to the missile. A receiving lens is mounted on the missile that receives the reflected laser radiation. A ferrule containing optical fibers divided into a plurality of pixels that receive the reflected laser radiation from the receiving lens, wherein each pixel in the plurality of pixels is provided a different pointing angle by arranging the fibers within the pixel such that the centroid of the field of view of the fibers is different from the centroids of the field of views of the other fibers in the other pixels. A plurality of optical sensors coupled to the optical fibers, each optical sensor being dedicated to a separate pointing angle and adapted to generate an electrical signal whose amplitude is responsive to the amplitude of the reflected radiation for the pointing angle that the optical sensor is dedicated to.

DETAILED DESCRIPTION OF THE INVENTION

With reference now to the drawings, a fiber optic LADAR system of particular utility for a guided missile will be described. While the present invention is described in terms of embodiment as a laser guided missile guidance and control system, it is to be understood that the invention is not so limited, being applicable to any vehicular guidance and control system using a LASER scanner and fiber optic receiver. In the missile example, the electromagnetic radiation obtained is laser light, although any other substantially monochromatic radiation could be employed. Also, in the missile example, the laser light detected by the receiver of the guidance system has been reflected from the target towards which the missile is being guided. It is to be understood that the laser or other substantially monochromatic radiation may be generated at or by the target, rather than being reflected from the target or generated by another platform.

Figure 1:
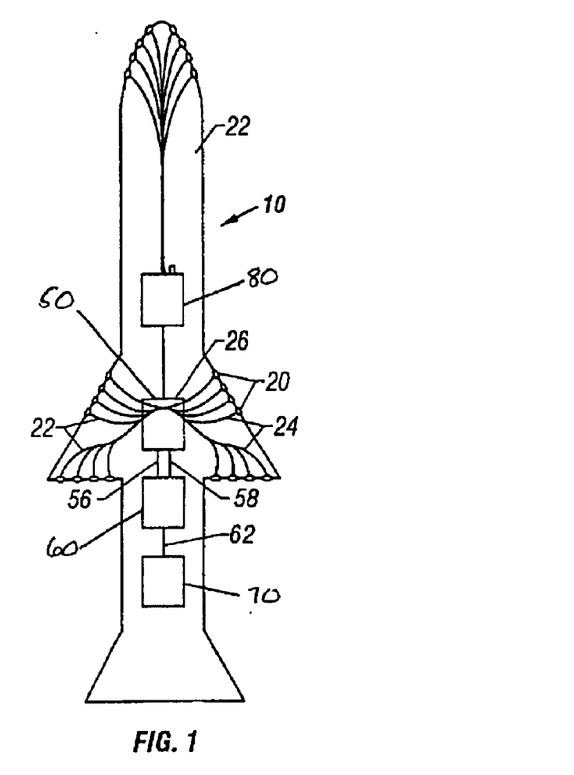
FIG. 1 is a schematic plan view of a missile, useful in an embodiment of the invention, depicting a plurality of exemplary locations for light-receiving apertures each containing optical fibers, distributed on leading and tailing edges of the fins or wings, and on the nose of the missile in accordance with the invention.

FIG. 1 is a schematic plan view of a vehicle, such as a missile 10, incorporating an array of apertures 20 each containing one set of a plurality of sets of optical fibers 22. A light receiving, or proximal, end 24 of each fiber is disposed at an individual aperture 20.

The distal end 26 of the fiber is interfaced with a detector unit 50. The proximal light receiving end 24 functions to allow light to enter the fiber without the need for additional light gathering optical devices, if desired. Preferably, the light receiving end 24 has a flat, polished end, and it is the incoming radiation that strikes this surface which provides the input to the detector 50 and thence the guidance and control system 60, 70 of the present invention through communication lines 56, 58, 62. The field of view of each individual fiber is determined primarily by its fiber numerical aperture, or the gain optics if used.

The aperture 20 may include a band pass filter, and or protective material which acts to protect the fiber from substances or conditions such as heat or cold. As described below, the aperture may contain a single fiber end, or it may contain multiple discrete fibers arranged in a fiber bundle. Preferably each individual optical fiber remains as a separate, individual fiber for its entire length. The range of multiples of the fibers which might be used is limited only by the size of the aperture required to allow each fiber to receive the incoming radiation. Each fiber is preferably made from standard clad optical fiber material typically having a diameter of approximately 125 microns to 400 microns. These diameters are exemplary only, and various other diameters may be used, as will be understood by those in the art.

Figure 2:
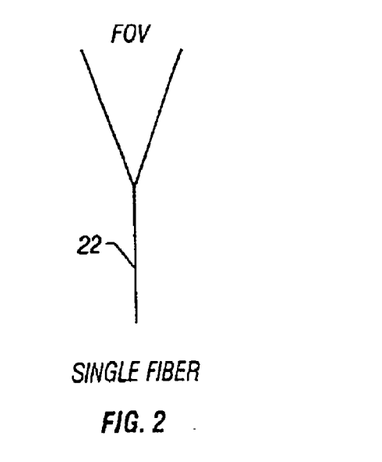
FIG. 2 is a schematic view of a single optical fiber together with a representation of its field of view in accordance with the invention.
Figure 5:
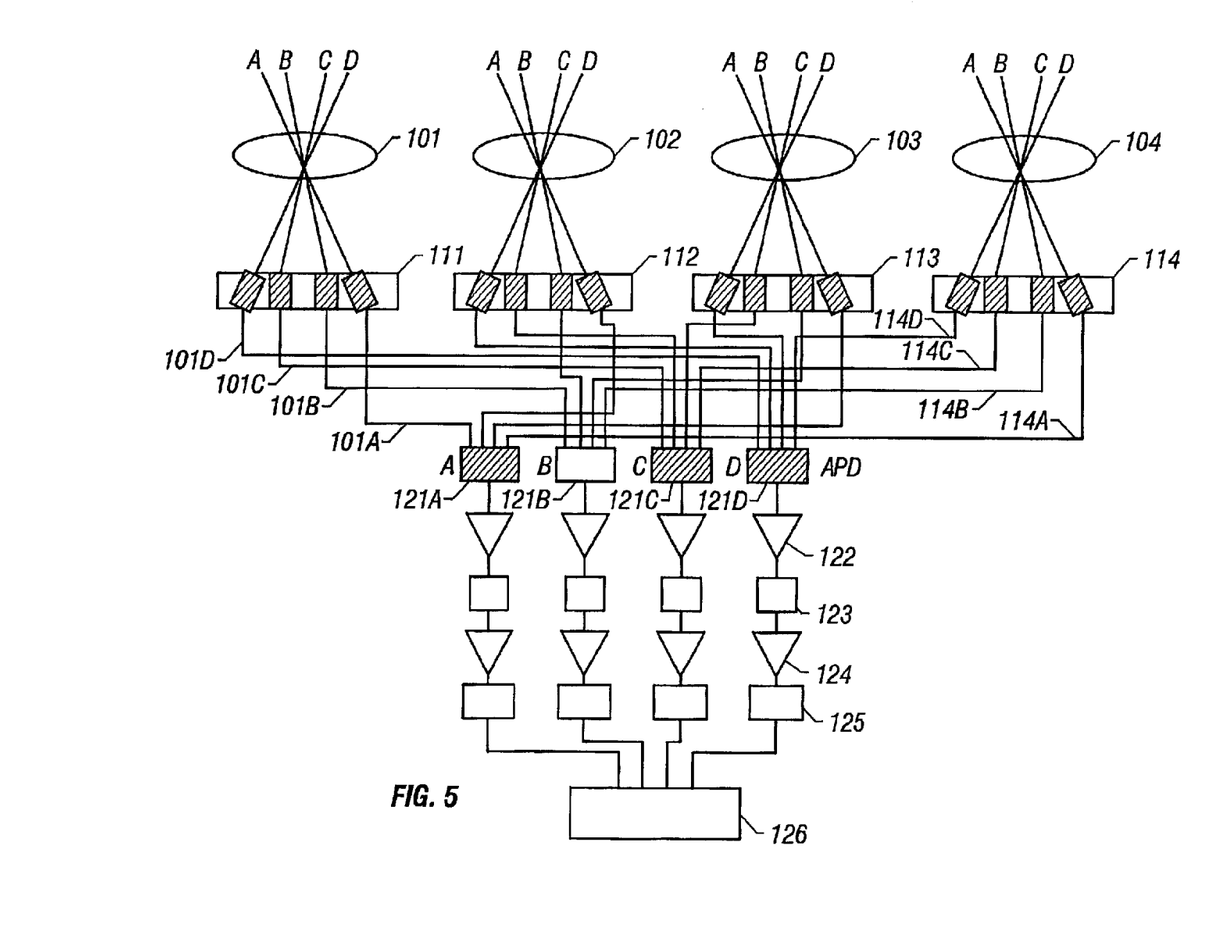
FIG. 5 is a schematic diagram of a Laser guidance system according to an embodiment of the invention.

Referring now to FIG. 2, each fiber 22 has a characteristic field of view ("FOV") as schematically shown. The field of view of a fiber depends primarily upon its numerical aperture. The numerical aperture acts to weaken and block incoming light rays or source signals emanating from an illuminated source, with the degree of weakening increasing until the signal is effectively blocked at an angle that exceeds the angle defined by the field of view associated with the numerical aperture. It is understood that while FIG. 5 illustrates the field of view in only two dimensions, the actual field of view of the fiber 22 is conical, in three dimensions. Whenever this specification refers to a field of view, the actual field is a three dimensional cone, with the apex of the cone at the first end 24 of the fiber 22. Light reaching the first end 24 from within the cone is within the field of view of the fiber.

Figure 3:
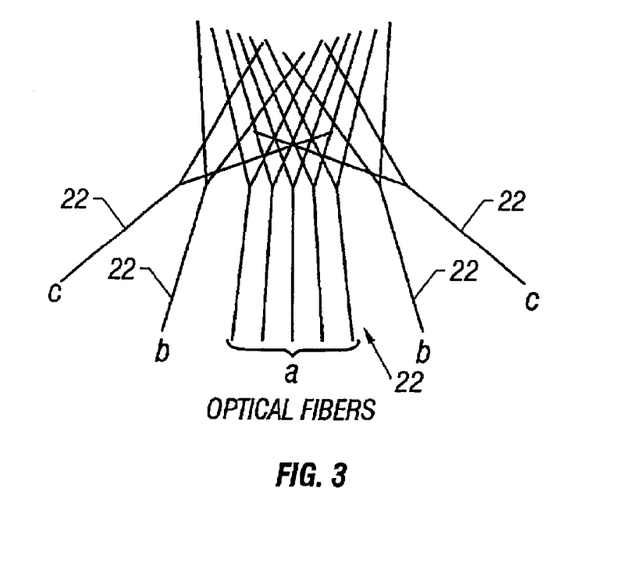
FIG. 3 is a schematic view of a group of arrayed optical fibers all having approximately the same field of view, showing how the fields of view of the arrayed fibers overlap, in accordance with the invention.
Figure 6:
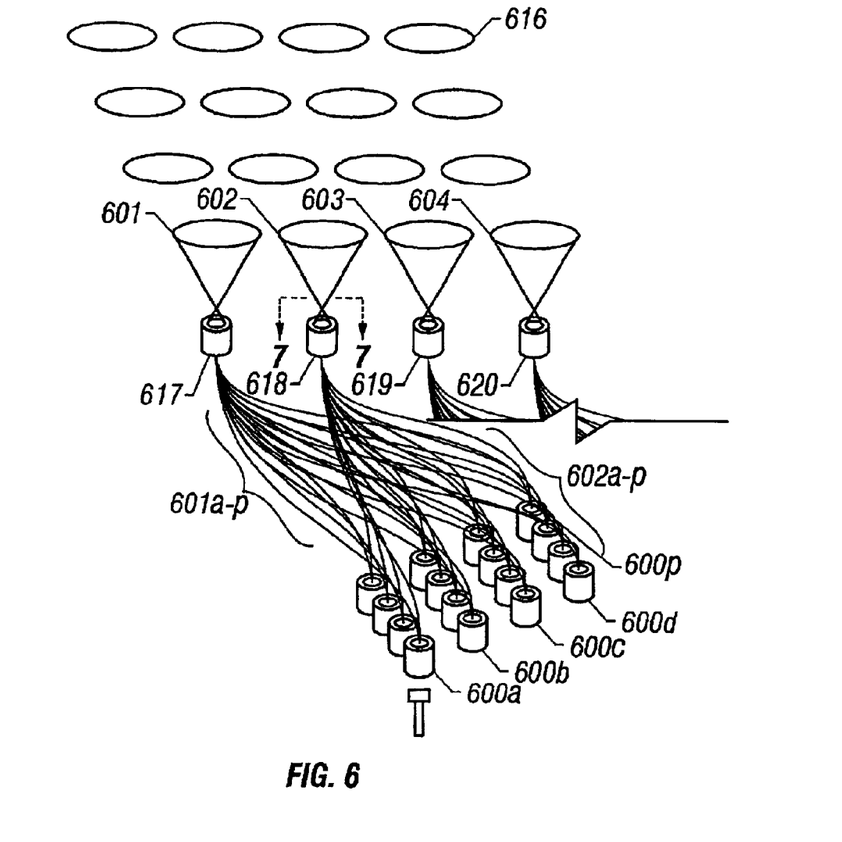
FIG. 6 is a schematic diagram of a Laser guidance system according to a further embodiment of the invention.

Referring now to FIG. 3, a plurality of optical fibers is shown arrayed to provide varying degrees of overlap of the fields of view of the individual fibers. In FIG. 6, all the fibers have substantially the same field of view, but this is not necessarily or preferably the case. The field of view, of the various fibers in the arrayed plurality of fibers may be selected to provide the degree of accuracy in determination of target direction required for a given direction relative to the vehicle. In other words, the accuracy in a given direction may be controlled by selection of, inter alia, the field of view of the fibers pointing in that direction, and by selection of the degree of overlap of adjacent fields of view. As suggested by the positions and orientations of the fibers, the five fibers near the center of the array, designated as the "a" group in FIG. 3, will provide the highest accuracy in determining of the position of or direction to a target near the center of their field of view. The next outwardly positioned two fibers, designated as the "b" group in FIG. 6, are both oriented in a different direction and overlap to a different degree with the adjacent fibers than do the fibers in the "a" group. These "b" group fibers provide a lower accuracy than do the "a" group fibers. Finally, the next outwardly positioned two fibers, designated as the "c" group, are oriented in yet another direction, and have fields of view with less overlap with adjacent fibers in groups "a" and "b." The "c" group fibers provide less accuracy than the "b" group fibers. Note that the numerical aperture of these groups of fibers may be selected so as to increase or decrease the available field of view of any of the fibers shown in FIG. 3. Likewise, additional fibers may be added, the fibers may be provided with other orientations, fields of view, and degrees of overlap with adjacent fiber fields of view, resulting in directionally selectable accuracies, in accordance with the selected parameters.

Figure 4:
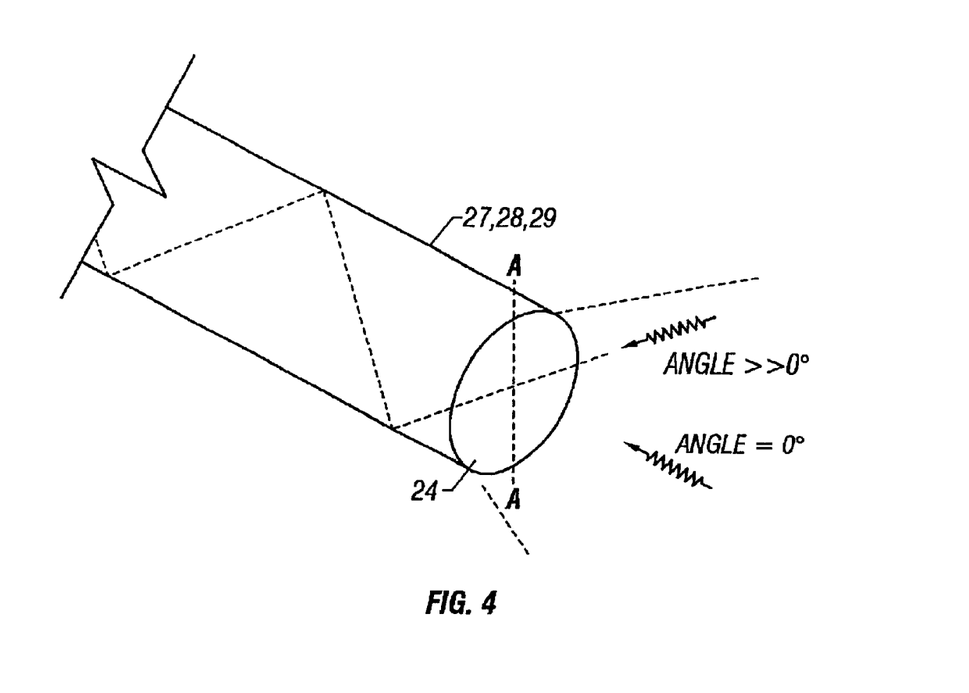
FIG. 4 is a schematic, magnified sectional view of the light receiving end of an optical fiber in accordance with the invention, including a representation of the path light rays might take through the fiber, depending on the angle of incidence of the light ray relative to the longitudinal axis of the fiber and how that is modified by gain optics.

Referring now to FIG. 4, a schematic drawing is shown of the light-receiving end 24 of the fiber 22. Preferably the end of the fiber is flat, and most preferably has been polished to a high degree so as to avoid distortion or loss of entering optical signals. The angle of incidence of incoming radiation is defined as the angle formed between the direction of propagation of the radiation and the central longitudinal axis of the fiber at or near the end of the fiber. It is well known to those in the art of fiber optics that the more interaction an optical signal traveling in a fiber has with the walls of the fiber, the more the strength of the optical signal is attenuated. An optical signal entering the fiber at an angle of incidence at or close to zero degrees will travel through the fiber with a minimum of interaction with the walls of the fiber and with a minimum of attenuation due to the effect of the refractive index of the optical fiber, and so will be attenuated very little by the passage. By contrast, an optical signal entering the fiber at an angle of incidence substantially greater than zero degrees will undergo many interactions with the wall of the fiber and will be significantly affected by the refractive index of the optical fiber, and so will be attenuated to a greater degree than optical signals entering at angles closer to zero degrees from the longitudinal axis of the fiber.

The radiation incident upon the end 24 of the fiber 22 will be further attenuated to a small but finite degree as a result of reflection of the incident radiation from the outer surface of end 24. The degree of attenuation due to reflection will vary with the angle of incidence, and other factors known to those in the arts. Such attenuation should also be constant for a given fiber at a given wavelength and so provides further information to the microprocessor in accurately determining the direction to the source. For higher optical gain, a beam contractor may be used.

For radiation incident upon the end 24 of the fiber 22, the strength of the optical signal initially entering the fiber 22 will be affected by the angle of incidence of the arriving radiation for another reason. If the radiation arrives at an angle of 0°, the end 24 of the fiber 22 appears to form a round disc if the fiber is round. Thus the "target," into which the radiation must enter to form an optical signal in the fiber, appears as a circle. By contrast, when radiation of the same wavelength arrives at the same end 24 of the fiber except at an angle substantially greater than zero degrees (0°), less of the incoming radiation can enter the end 24 of the fiber 22, simply because the "target" from this angle forms an ellipse having an apparent area smaller than a circle. The width of the ellipse becomes smaller with increasing angle of incidence. Thus, simply because the "target" is smaller, and less radiation will enter the fiber. This effect is in addition to the effect of the refractive index and other physical variables such as reflection which contribute to the attenuation of the signal indexed by the numerical aperture.

As a result of these attenuation effects arising from and related to the angle of incidence, optical signals arriving at the detector will have a signal strength related to the angle of incidence. The exact relationship between angle of incidence and attenuation will vary depending on the material from which the optical fiber is made and on the wavelength of the incoming radiation, but should be reproducible for a particular fiber and laser combination, and being the same for both start and azimuth and elevation stop fibers allows accurate determination of the directional relationship between the vehicle and the radiating target. This is the result of the attenuation of overlapping field of view optics being added to the make the composite azimuth and elevation stop signals through their respective delay lines.

Referring now to FIG. 5, there is shown a laser guidance system according to an embodiment of the invention. In this embodiment, the system includes four sets of collection optics 101, 102, 103 and 104, such as lenses or lens systems, used in conventional laser guidance systems. In this example the collector optics, also referred to as receiving optics, are shown as single lenses. Arranged behind each collection optic is a fiber collection ferrule 111, 112, 113 and 114, respectively. Each fiber collection ferrule holds in place a plurality of optical fibers or fiber bundles, 101A–101P through 104A–104D. Each fiber bundle in each ferrule is provided with a "pointing angle". A pointing angle is the angle between the axial center or centroid, of the FOV of a given fiber bundle relative to a pre-defined axis such as the central axis of the missile. In this example, there are four different pointing angles A, B, C, and D, and each ferrule contains a fiber bundle for each pointing angle. The magnitude, direction, and number of different pointing angles that may be used in a practical system are a matter of design choice.

The fiber bundles are coupled to a plurality of optical detectors 121A–121D that convert incoming light into electrical signals. One optical detector is provided for each pointing angle. Taking pointing angle "A" as an example, it is seen that each collecting lens 101–104 is associated with an optical fiber bundle having a pointing angle of A, i.e., 101A, 102A, 103A and 104A. All four of these fiber bundles for pointing angle A are coupled to optical detector 121A. The same arrangement is repeated for pointing angles B–D.

For another example, consideration will be given to laser radiation striking collecting lens 101. A beam of laser radiation striking lens 101 from the general directing of point angle a will have most of its energy directed by lens 101 into fiber bundle 101A. Lesser amounts, if any, of the incoming laser radiation will be directed into the light receiving ends of fibers 101B–101D. Thus, the amount of energy from the incoming laser radiation passed to optical detector A through fiber bundle 101A will be greater than the amounts of optical energy passed to the other detectors B, C and D by fiber bundles 101B, 101C and 101D, respectively. Again, the same will be true for lenses 102–104.

The amplitude of the electrical signals generated by the optical detectors in this embodiment, is proportional to the amplitude of the incoming laser radiation for each pointing angle. Suitable optical detectors include avalanche pin diodes ("APD"), pin diodes ("PD") or charge couple devices ("CCDs") depending upon the sensitivity required by the application. Thus, if the incoming laser radiation strikes the missile from a direction generally parallel to pointing angle A, the electrical signal that would be generated by detector 121A will be proportionally greater than the signals generated by detectors 121B–121D. Signals from the detectors are passed to a computer 126 that, in one embodiment, uses mathematical interpolation to calculate the direction of the incoming laser radiation from the differences in the amplitude of the detector signals. Of course, the invention is not limited to interpolation, and those of skill in the art will understand that other conventional signal processing techniques can be applied to the detector signals as a matter of design choice depending on the application and specifications to be met by a particular system. Once the direction from which the incoming laser radiation was received is determined, conventional guidance systems are used to adjust the travel direction of the missile to "home in" and move towards the target. The collection optics can be distributed on the vehicle as necessary to obtain a clear field of view. It should be noted that the collection optics themselves have a field of view and a pointing angle. In this example, each lens 101, 102, 103 and 104, has the same pointing angle and field of view.

It is useful to amplify and filter the detector signals before passing them to the computer 126. In the example shown in FIG. 1, the signals are first processed by passing them through transimpedance amplifiers 122, band pass filters 123, logarithmic amplifiers 124, and sample and hold circuits 125. Again, other signal processing circuits can be used as a matter of design choice.

FIG. 6 is a schematic diagram depicting an embodiment of the invention using a 16 pixel array. In this embodiment, there are 16 collection lenses, 601–616 arranged in the laser detection system. It will be understood that the number of collection lenses does not necessarily correspond to the number of collection channels on the image plane or to the number of pointing angles, but this number has been chosen for purposes of illustration only. Behind each collection lens 601–616 is positioned is a collection ferrule. For convenience, only ferrules 617–620, associated with lenses 601–604, are shown in FIG. 6. Each ferrule contains the fiber bundles used to transmit incoming laser light to the detectors.

Figure 7:
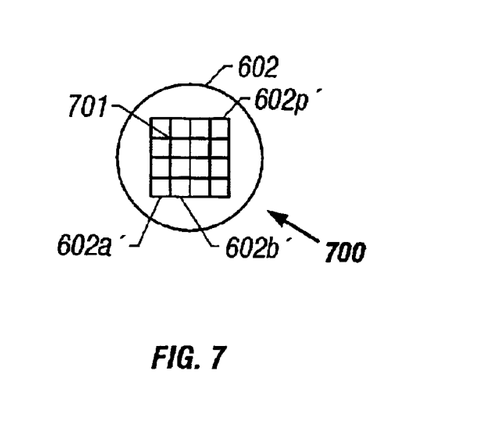
FIG. 7 is a plan view of an image plane of 16×16 pixels positioned behind the collection optics according to an embodiment of the invention.
Figure 8:
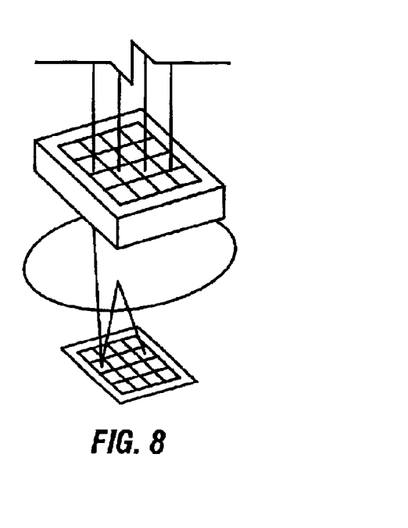
FIG. 8 is a three-dimensional view of a ferrule holding an array of fiber bundles for each pointing angle.

The fiber bundles are arranged in the ferrules to form an image plane, 601–616. An exemplary image plane taken along lines A–A' behind collection lens 602 is shown in FIG. 7. As can be seen, the image plane, 700 behind lens 602 is arranged as a four by four rectangle of fiber bundles, for a total of 16 pixels 602A'–602P'. In each pixel is located a single fiber bundle 602A–602P, which, in turn, has a predetermined pointing angle. Thus, there are sixteen different pointing angles used in the example of FIG. 6. It will also be noted that there are 16 different image planes, one for each lens 601–616. In this example, the pointing angles of each image plane are the same. Thus the pointing angle for all fiber bundles in a given pixel will be the same for all image planes. Put another way, what is shown as the lower left hand pixel 602A in FIG. 7 has the same pointing angle for each pixel in the same location for each image plane in the embodiment. In other versions of the invention, different pointing angles could be given to different image planes, however, the electronics for calculating the direction to the target must take this into account or case must be taken to ensure that only signals from a single pointing angle are passed to any given optical detector.

Each fiber bundle 602A–602P is coupled to its corresponding optical detector 600A–600P. Thus, pixel 602A' is coupled by fiber optic cable 602A to optical detector 600A, pixel 602B' is coupled to optical detector 600B by fiber optic 602B, and so forth.

The same arrangement is repeated for each of the collection lenses 601–616. Thus, pixel 601A' is connected by fiber bundle 601A to detector 600A, pixel 601B' is connected by fiber bundle 601B to optical detector 600B, and so forth. In short, in the exemplary system shown in FIG. 6, the pixel for pointing angle A for each image plane of each collection lens, will be optically coupled with detector 600A, giving optical detector 600A a total of 16 optical channels through which it will receive incoming laser radiation. The same arrangement is repeated for each pixel in each collection lens for pointing angles B through P.

Referring again to FIG. 7, it will be noted that in this embodiment to the invention the collection lenses are focused on the image plane so that the image spot from the received laser radiation is just slightly larger than a single pixel. This allows the system to track a moving target without loss of information as the spot of incoming laser radiation moves from pixel to pixel on the image plane.

In the embodiment shown in FIG. 6, the centroid of the field of view of each of the multiple collection lenses 601–616, is parallel. Thus, each of the lenses is "looking" in the same direction. In further embodiment to the invention, the field of view of the entire guidance system (i.e., the collective field of view of all collection lenses) can be increased by positioning some of the collection lenses so that the centroid of their field of views diverges from each other. While providing an increased field of view for the guidance system, it should be noted that the pointing images for each of the pixels should not change in order to allow the guidance system to accurately determine the direction of the incoming laser radiation. In other words, even if the centroid of the field of view of the collection lens is changed, the optical energy received by the fiber optic cables in its image plane still corresponds to the same pointing angles as before so that the laser radiation received at each detector is consistently from a single pointing angle allowing for the computer to calculate the correct angle to the target.

This arrangement allows the total aperture of the optical detector in a given direction to be the combined aperture of every collecting lens looking in the same direction, thereby maximizing the signal. Further, the field of view for each pixel can be limited and combined with band pass filters to minimize the noise due to background radiation, such as sun light. These steps will maximize the signal's noise level. It is advantageous that when the lens is placed in the aperture of a vehicle that is obstructed in a given direction, such as those looking at the missile body, these apertures are not populated with fibers.

In further advantageous embodiments of the invention, the receiver electronics include high sensitivity, low noise, high band width amplifiers followed by matched filters designed to match the pulse shape of the laser radiation. The output is then converted to a digital signal in an analogue to digital converter and fed to an on-board computer. In further advantageous embodiments, the computer is equipped with filtering software in the temporal domain to sort jammer pulses from the desired incoming laser radiation and then use amplitude interpolation between pixels to determine the exact direction from which the desired incoming laser radiation came. The use of separate receiver electronics for each detector channel allows a fast processing rate, for example 10 kilohertz which will support advanced laser jammer rejection software.

In still a further embodiment of the invention, the collection optics may be arranged in two concentric rings on the forward section of the missile. One ring will have a more outward looking field of view than the other. This enables the total sensor set to have a larger total field of view, while the individual receiver lenses have a lower field of view. This configuration allows a non-gimbaled seeker to have a large field of view, but control the background radiation level going to the optical detectors, or sensors, just as a gimbaled seeker can without the complexities of the gimbal. When the fiber bundles from the image plane of each received lens are combined, all the pixels from the different receive lenses looking in the same direction are combined into this same optical sensor.

Although this invention has been described with respect to certain exemplary embodiments, it is to be understood that the specific embodiments are for purposes of illustration and not limitation, as other variations will occur to those of skill in the art.

What is claimed is:

1. A laser guidance system comprising:
    a laser that transmits a beam of laser radiation to a target area;
    a collecting lens for receiving reflected laser radiation from the target area and directing the received laser radiation onto an image plane;
    at least two optical fibers within a collection ferrule, the end orientation angle of at least one of the optical fibers being different than the other optical fibers, wherein the optical fibers are arranged to pass the received radiation to at least two optical detectors that convert laser radiation into electrical signals whose amplitude is proportional to the amplitude of the laser radiation, the detectors being associated with different end orientation angles;
    a computer that uses the electrical signals from the optical detectors to determine the direction of the received laser radiation.

2. A laser guidance system as in claim 1 further comprising a ferrule positioned on the image plane of the collecting lens, the ferrule including optical fibers having different end orientation angles.

3. A laser guidance system as in claim 2 wherein the ferrule is divided into pixels, each pixel being populated with at least one optical fiber, wherein the end orientation angles of the optical fibers is different for each pixel.

4. A laser guidance system as in claim 1 wherein the computer calculates the direction of the received laser radiation by interpolating the amplitude of the electrical signals from the optical detectors.

5. A method for guiding a vehicle toward a target, the method comprising:
    receiving incoming laser radiation from the target at collection lenses on the vehicle;
    projecting the incoming laser radiation onto at least two optical fibers within a collection ferrule, at least one of the optical fibers having a different end orientation angle relative to the other optical fibers;
    passing the incoming laser radiation through the optical fibers to at least two optical detectors, one for each end orientation angle, each detector generating an electrical signal having an amplitude proportional to the amplitude of the incoming laser radiation; and
    passing the electrical signals to a computer on board the vehicle that determines the direction of the incoming laser radiation by comparing the electrical signals.

6. A method as in claim 5 further comprising arranging the optical fibers into pixels, each pixel being associated with a different end orientation angle.

7. A method as in claim 6 further comprising focusing the incoming laser radiation such that it falls on more than one pixel for each end orientation angle.

8. An apparatus for determining the direction to a target, the apparatus comprising:
    a lens that receives laser radiation emanating from the target and directs it onto an image plane;
    a ferrule disposed in the image plane that contains a plurality of optical fibers arranged into pixels corresponding to end orientation angles, the end orientation angles being relative to each other wherein at least two pixels have different end orientation angles with respect to each other;
    a plurality of optical detectors coupled to the optical fibers, each optical detector being associated with one of the end orientation angles and adapted to generate an electrical signal responsive to the amount of laser radiation received from the optical fibers coupled to it; and
    electronic circuitry that determines the direction to the target based on the electrical signals produced by the optical detectors.

9. An apparatus as in claim 8 the electronic circuitry determines the direction to the target by interpolating the amplitude of the electronic signals generated responsive to the amplitude of laser radiation received at each of the end orientation angles.

10. An apparatus as in claim 9 further comprising a second lens, having a different end orientation angle from the first lens, that receives laser radiation emanation from the target and directs it onto a second image plane, wherein the second image plane contains a plurality of optical fibers arranged into pixels corresponding to a second set of end orientation angles, at least one of the second set of end orientation angles being common with at least one end orientation angle in the first set of end orientation angles.

11. A guided missile having a laser guidance system comprising:
    a laser that directs laser radiation in the general direction of a target that is subsequently reflected from the target back to the missile;
    a receiving lens mounted on the missile that receives the reflected laser radiation;
    a ferrule containing optical fibers divided into a plurality of pixels that receive the reflected laser radiation from the receiving lens, wherein each pixel in the plurality of pixels is provided a different end orientation angle, relative to each other wherein at least two pixels have different end orientation angles with respect to each other by arranging the fibers within the pixel such that the centroid of the field of view of the fibers is different from the centroids of the field of views of the other fibers in the other pixels; and
    a plurality of optical sensors coupled to the optical fibers, each optical sensor being dedicated to a separate end orientation angle and adapted to generate an electrical signal whose amplitude is responsive to the amplitude of the reflected radiation for the end orientation angle that the optical sensor is dedicated to.

* * * * *

UNITED STATES PATENT AND TRADEMARK OFFICE
CERTIFICATE OF CORRECTION

PATENT NO.         : 6,943,873 B2
APPLICATION NO. : 09/907148
DATED              : September 13, 2005
INVENTOR(S)        : Bradley Sallee It is certified that error appears in the above-identified patent and that said Letters Patent is hereby corrected as shown below:

On the title page, item (73), please delete "BAE Systems Integrated Defense Solutions Inc." and insert therefor --BAE SYSTEMS Information and Electronic Systems Integration Inc.--.

Signed and Sealed this

Second Day of October, 2007

JON W. DUDAS
*Director of the United States Patent and Trademark Office*